United States Patent [19]
Woo et al.

[11] Patent Number: 5,627,548
[45] Date of Patent: May 6, 1997

[54] NAVIGATION WRISTWEAR

[75] Inventors: Arthur N. Woo, Cupertino; Kiyoko M. Mura-Smith, Los Altos Hills, both of Calif.; Gregory T. Janky, Bellingham, Wash.

[73] Assignee: Trimble Navigation Limited, Sunnyvale, Calif.

[21] Appl. No.: 563,568

[22] Filed: Nov. 30, 1995

[51] Int. Cl.[6] ................................. G01S 5/02
[52] U.S. Cl. ........................... 342/357; 342/352
[58] Field of Search ..................... 342/357, 352, 342/356; 455/12.1

[56] References Cited

U.S. PATENT DOCUMENTS

| | | | |
|---|---|---|---|
| 4,480,253 | 10/1984 | Anderson | 340/825.69 |
| 4,673,936 | 6/1987 | Kotoh | 342/51 |
| 5,021,794 | 6/1991 | Lawrence | 342/457 |
| 5,293,170 | 3/1994 | Lorenz et al. | 342/352 |
| 5,345,244 | 9/1994 | Gildea et al. | 342/357 |
| 5,402,347 | 3/1995 | McBurney et al. | 364/443 |
| 5,459,473 | 10/1995 | Dempster et al. | 342/357 |
| 5,515,057 | 5/1996 | Lennen et al. | 342/357 |
| 5,519,620 | 5/1996 | Talbot et al. | 364/449 |

*Primary Examiner*—Thomas H. Tarcza
*Assistant Examiner*—Dao L. Phan
*Attorney, Agent, or Firm*—Thomas E. Schatzel; Law Offices of Thomas E. Schatzel A Prof. Corporation

[57] ABSTRACT

A navigation wristwear device comprises a GPS receiver fully disposed in a wrist watch type housing. A transparent microwave patch antenna is patterned of indium-tin-oxide on sapphire in front of an LCD time, position and velocity display. A bezel provides a protective window. A low-noise amplifier, downconversion, code processing and navigation processing are all provided on a single integrated circuit. Photovoltaic solar cells to each side of the LCD help keep a battery charged.

12 Claims, 5 Drawing Sheets

NAVIGATION WRISTWEAR

BACKGROUND OF THE INVENTION

1. Field of the Invention

The invention relates generally to satellite navigation equipment and more specifically to personal navigation wristwear.

2. Description of the Prior Art

Global positioning system (GPS) receivers for consumer use have dramatically decreased in size and price due to on-going developments in semiconductor fabricating technology and the manufacturing scales of economy possible for consumer products. Handheld portable GPS receivers about the size of a large candy bar are now selling for under $300. Smaller and better performing equipment is still possible.

David Gildea and Charles Trimble describe in U.S. Pat. No. 5,345,244, issued Sep. 6, 1994, a cordless SPS smart antenna device. Such patent is incorporated herein by reference. What is essentially a complete GPS receiver is partitioned into two parts, a smart part and a display part. Both the code processing for satellite tracking and the navigation processing for position and velocity solutions are done in the smart part. The device permits a user to roam in areas that would not permit direct GPS receiver operation, e.g., indoors, under tree-cover, etc. However, since the navigation processing is done in the smart part, the part not carried by the user, the manipulation of databases and other high-end functions are hindered because the display part alone is too far down the processing stream.

SUMMARY OF THE PRESENT INVENTION

It is therefore an object of the present invention to provide a whole GPS receiver in a watch housing.

It is another object of the present invention to provide a GPS receiver that is split in two parts where the navigation processing is done in a unit worn on the wrist of a user and can be turned off at will without incurring a time-to-first-fix penalty when turned back on.

Briefly, a navigation wristwear device embodiment of the present invention comprises a GPS receiver fully disposed in a wrist watch type housing. A transparent microwave patch antenna is patterned of indium-tin-oxide on sapphire in front of an LCD time, position and velocity display. A bezel provides a protective window. A low-noise amplifier, downconversion, code processing and navigation processing are all provided on a single integrated circuit. Photovoltaic solar cells to each side of the LCD help keep a battery charged.

An advantage of the present invention is that a GPS receiver is provided that allows users to receive personal navigation information in a wrist watch device.

Another advantage of the present invention is that a two-part GPS receiver is provided that displays its first fix near instantly after its wrist-worn part is turned on.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENT

Figure 1:
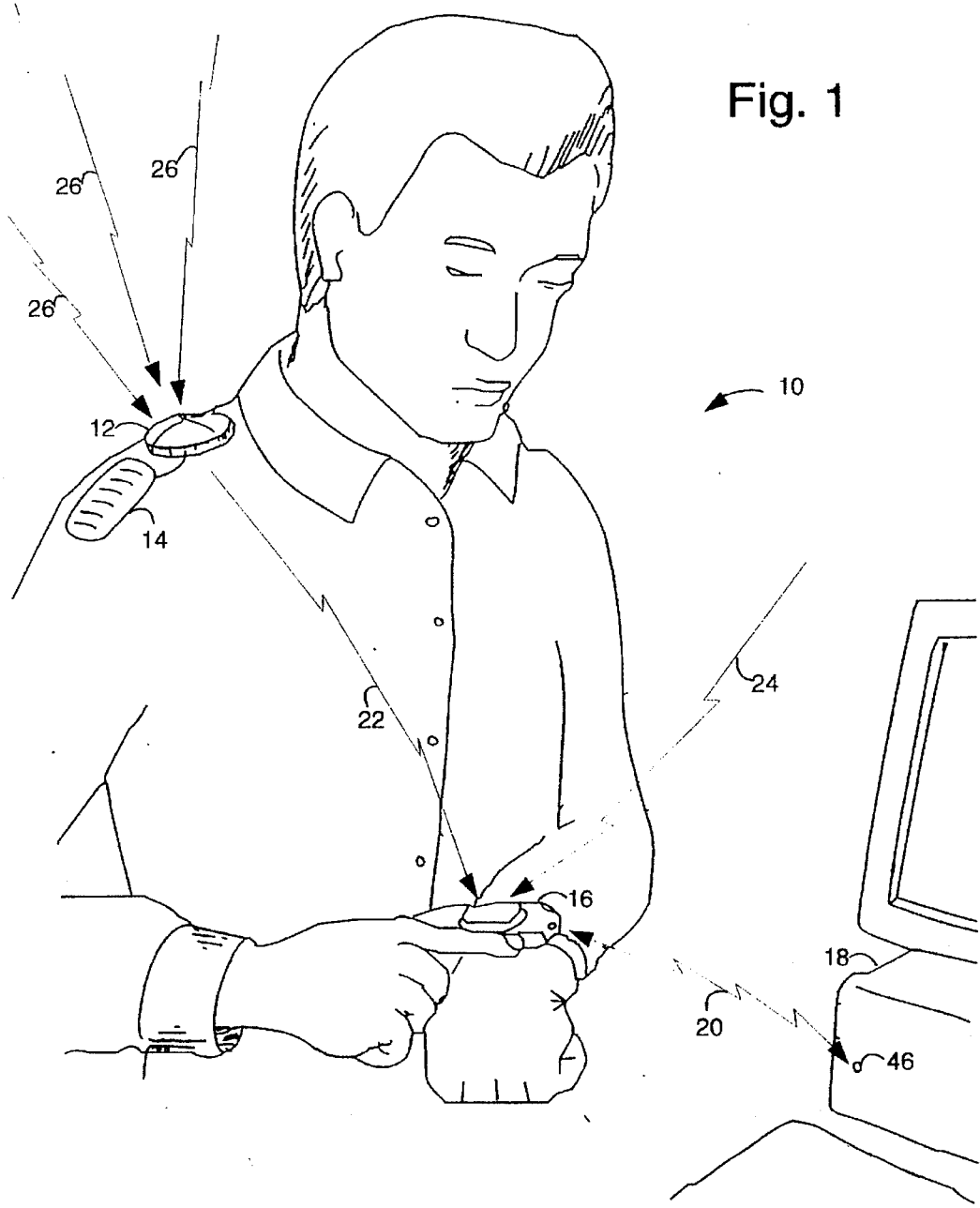
FIG. 1 is a diagram of a user wearing a GPS receiver system embodiment of the present invention having two parts, a shoulder unit and a wrist unit.
Figure 2:
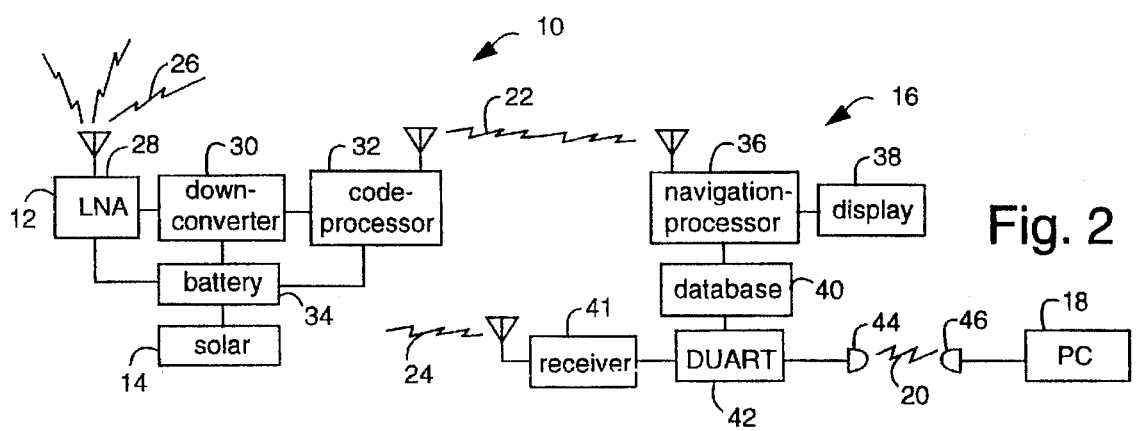
FIG. 2 is a block diagram of the GPS receiver system of FIG. 1.

FIGS. 1 and 2 illustrate a global positioning system (GPS) receiver system embodiment of the present invention, referred to herein by the general reference numeral 10. GPS receiver system 10 comprises a shoulder-worn unit 12 with an optional photo-voltaic (PV) solar cell 14, and a wrist-worn unit 16. A personal computer (PC) 18 provides database and data-logging support over an infrared link 20. The shoulder-worn unit 12 and the wrist-worn unit 16 communicate with a radio link 22. Differential-correction and so-called "RTCM" data is received over a radio link 24, e.g., from a local beacon or reference station. A plurality of L-band microwave signals 26 are received from orbiting navigation satellites and such signals are coded to provide ranging and timing information.

The timing information provided is system time, e.g., universal time, AKA Greenwich Mean Time (GMT). For a wrist watch wearer, the local time is usually of interest and therefore the time zone position of the watch on earth must be known or assumed. Where the correct time zone is known or can be assumed, e.g., from the last good position fix, only one satellite signal 26 need be received to extract the timing information for watch function. Such single signal 26 need not even be tracked in real time. For example, the samples of the signal 26 may be collected and stored, and then decoded in post processing by a very slow and inexpensive microcomputer. Such functioning is compatible with all but the most demanding of watch timekeeping applications.

Although the unit 12 is described as "shoulder-worn", it can, in fact, be placed anywhere in the vicinity of the wrist-worn unit 16 that provides for the reception of the microwave signals 26, e.g., on the top of the mast of a sailboat, on the back of a utility vest or life vest, on a cap or helmet, etc. Off-the-body locations have the advantage of being less prone to losing satellite tracking, as can occur when the user/wearer goes below-decks or indoors. Several wrist-worn units 16 can be associated with a single unit 12, e.g., where the unit 12 is mounted to a sailboat mast for a clear view of the sky and the wrist-worn units 16 are worn by each member of the crew and used above and below decks, especially if the radio link 22 is a long wave frequency that can more easily penetrate the superstructure of the boat. Each wrist-worn unit can be freely turned on and off to save battery power, as satellite tracking is maintained only by the unit 12 and each wrist-worn unit 16 is capable of presenting a near instant navigation solution when it is first turned on.

The shoulder-worn unit 12 comprises a low-noise amplifier (LNA) 28 to boost the L-band microwave signals 26, a downconverter 30 to translate the radio frequency carriers to a frequency suitable for digital processing, and a code processor 32 to remove the spreading codes used in the signals 26 and to track navigation satellites overhead. A battery 34, e.g., a nickel-metal-hydride type, is used to supply operating power and is ideally kept charged by the PV solar cell 14. Corrected ranging and timing information, the raw data needed to compute a navigation and position solution, is transmitted by the code-processor 32 over the radio link 22 to a navigation processor 36 in the wrist-worn unit 16. The code-processor 32 and navigation processor 36 are, by necessity, implemented with separate microprocessors or digital signal processors (DSP).

The downconversion, code-processing and navigation-processing can be constructed from conventional designs. For example, see U.S. Pat. No. 4,754,465, issued to one of the present inventors, Charles Trimble; U.S. Pat. No. 4,970,523, issued Nov. 13, 1990, to Braisted, et al.; U.S. Pat. No. 5,108,334, issued Apr. 28, 1992, to Eschenbach, et al.; U.S. Pat. No. 5,311,149, issued May 10, 1994, to Wagner, et al.; all incorporated herein by reference.

The wrist-worn unit 16 further comprises a liquid crystal display (LCD) 38 of the navigation and position solution, a database 40, a radio receiver or pager receiver 41, a dual universal asynchronous receiver transmitter (DUART) 42 and a photodetector and diode 44 for two-way infrared transmission and communication with a similar device 46 included in the PC 18.

For example, the database 40 provides a database of map coordinates for a plurality of regional, area and detail map pages from a hard copy map atlas that relate to their respective page and grid identifications. Included is a database map indexer for converting a position fix obtained from the navigation computer into a map page and grid reference.

Since the wrist-worn unit 16 resembles a wrist watch, and since tracking GPS satellite signals provides GPS-accurate time and position, it is preferable in alternative embodiments of the present invention to display the local time on the LCD 38. See, U.S. Pat. No. 5,319,374, issued Jun. 7, 1994, to Desai, et al., and incorporated herein by reference.

Figure 3:
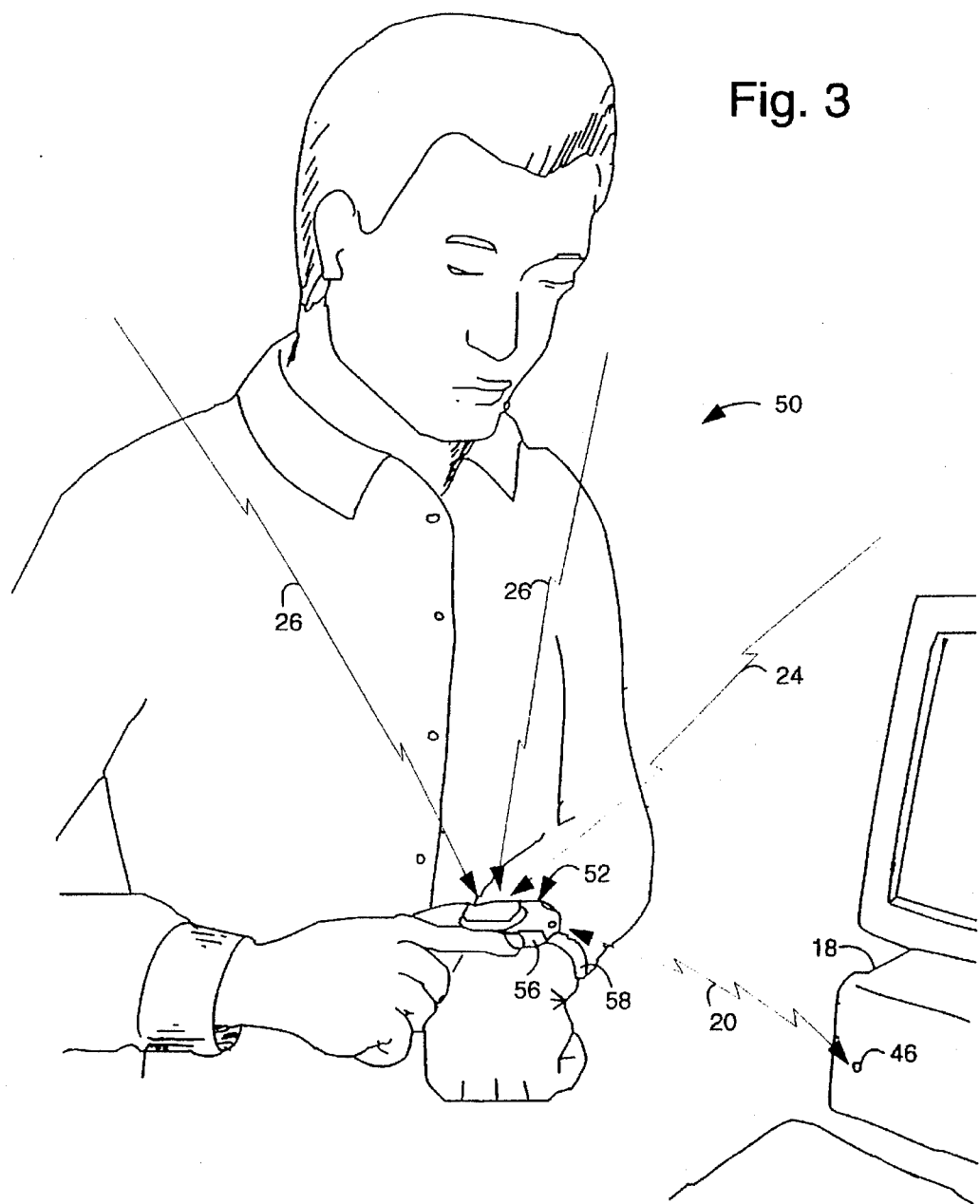
FIG. 3 is a diagram of a user wearing a GPS receiver system embodiment of the present invention entirely disposed in a wrist unit.
Figure 4:
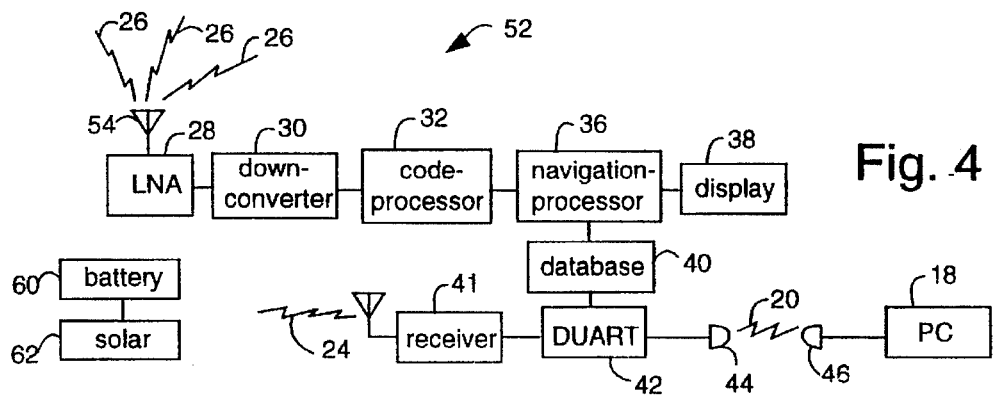
FIG. 4 is a block diagram of the GPS receiver system of FIG. 3.

FIGS. 3 and 4 illustrate a global positioning system (GPS) receiver system embodiment of the present invention, referred to herein by the general reference numeral 50. GPS receiver system 50 has components that are similar to those of system 10 in FIGS. 1 and 2, and these share the same element numbers. The system 50 comprises a wristwear GPS receiver 52 that receives the L-band microwave signals 26 directly with a watch-crystal antenna 54. The LNA 28, downconverter 30, code-processor 32, navigation processor 36, display 38, database 40, a radio receiver or pager receiver 41 and DUART 42 are all contained in a single case 56 with a wrist strap 58. A battery 60 provides power and a solar cell 62 keeps the battery 60 charged.

Figure 5:
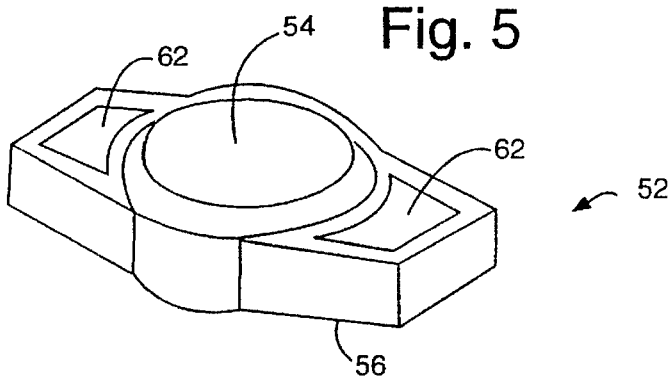
FIG. 5 is a perspective view of the GPS receiver of FIG. 3 without its wrist straps.
Figure 6:
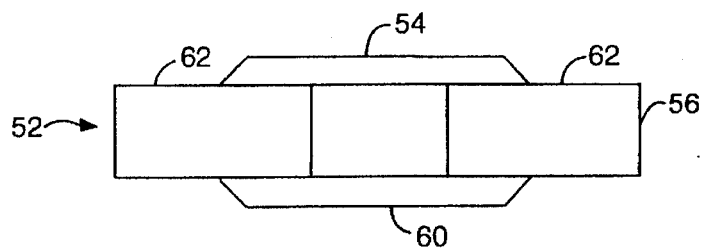
FIG. 6 is a side view of the GPS receiver of FIG. 5.
Figure 7:
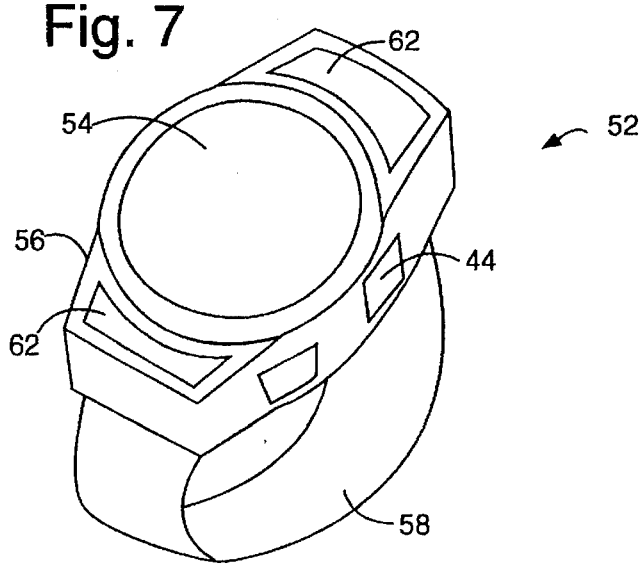
FIG. 7 is a perspective view of the GPS receiver of FIG. 3 with its wrist straps.

FIGS. 5–7 show the wristwear GPS receiver 52 in various perspective views of the exterior. The wrist strap 58 is not shown in FIGS. 5 and 6, e.g., as if it were detached.

Figure 8A:
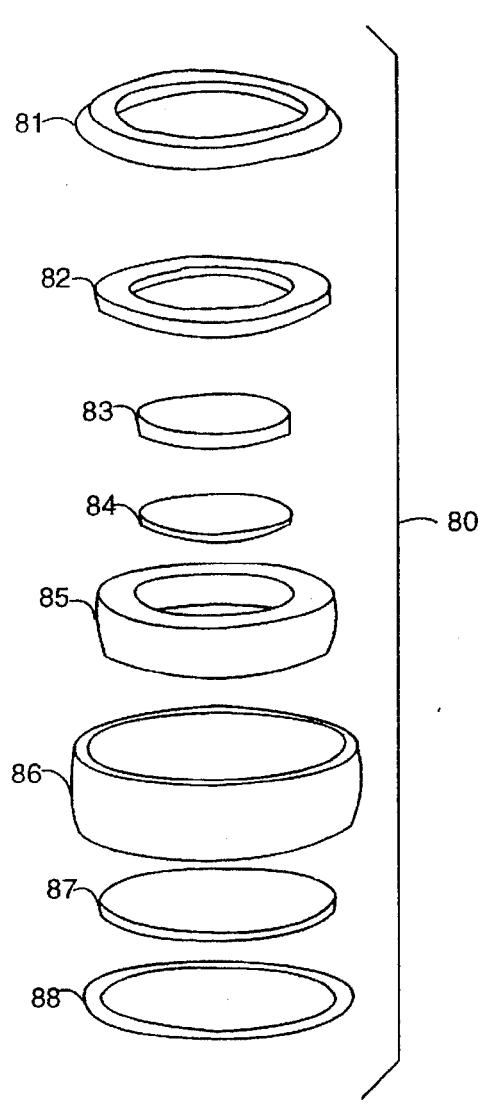
FIG. 8A is an exploded assembly diagram of a device similar to the GPS receiver of FIG. 3 that is based on an annular ring GPS antenna.
Figure 8B:
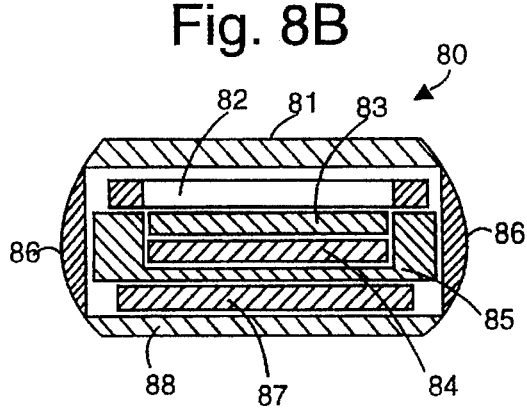
FIG. 8B is a transverse cross-section of the device of FIG. 8A.

FIGS. 8A and 8B illustrate a GPS wristwear receiver 80, which is similar to the receiver 52 in FIGS. 3 and 4. The GPS wristwear receiver 80 is an assembly of a watch face bezel 81, an annular antenna 82 to receive L-band microwave signals 26, a liquid crystal display (LCD) 83, an integrated circuit (IC) 84 and a dielectric cup 85 that all fit into a watch case 86. A battery 87 fits in behind and is held in by a backing plate 88. The IC 84 includes, for example, the LNA 28, downconverter 30, code-processor 32, navigation processor 36, database 40, a radio receiver or pager receiver 41 and DUART 42. The LCD 83 is similar to LCD 38. The fabrication of the IC 84 can be done by using the commercially-available manufacturing and design services of a chip foundry, ASIC supplier, and/or fully custom logic supplier, e.g., Cirrus Logic (San Jose, Calif.), LSI Logic (Milpitas, Calif.), etc.

Figure 9A:
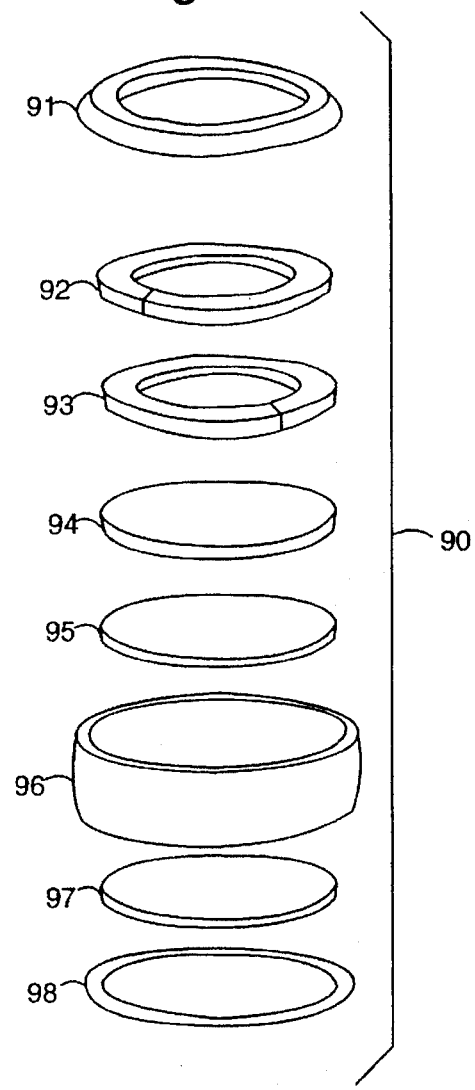
FIG. 9A is an exploded assembly diagram of a device similar to the GPS receiver of FIG. 3 that is based on a circular dipole GPS antenna.
Figure 9B:
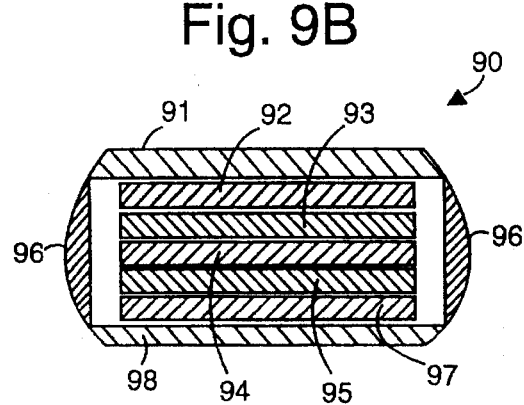
FIG. 9B is a transverse cross-section of the device of FIG. 9A.

FIGS. 9A and 9B illustrate a GPS wristwear receiver 90, which is similar to the receiver 80 in FIGS. 8A and 8B, but differs essentially in the kind of antenna used to receive the navigation satellite transmissions. The GPS wristwear receiver 90 is an assembly of a watch face bezel 91, a pair of circular dipole antennas 92 and 93 to receive L-band microwave signals 26, a liquid crystal display (LCD) 94 and an integrated circuit (IC) 95 that all fit into a watch case 96. A battery 97 fits in behind and is held in by a backing plate 98. The IC 94 includes, for example, the LNA 28, downconverter 30, code-processor 32, navigation processor 36, database 40, a radio receiver or pager receiver 41 and DUART 42. The LCD 94 is similar to LCD 38.

Figure 10A:
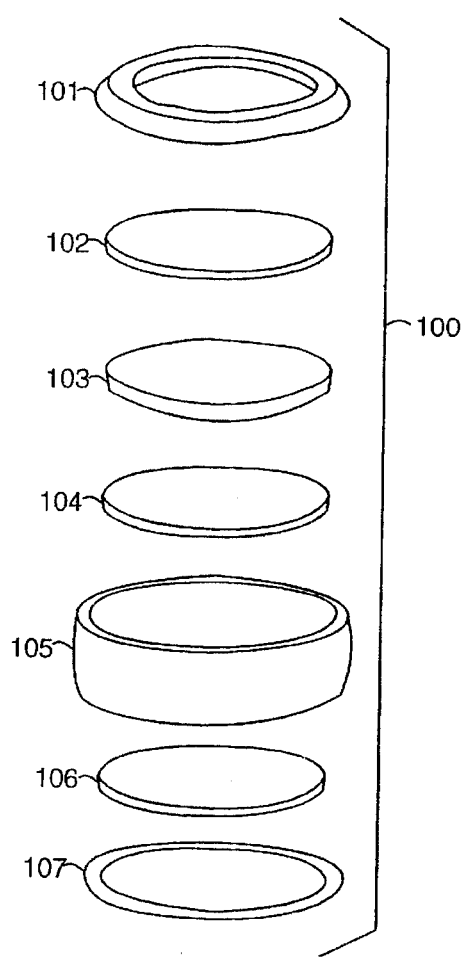
FIG. 10A is an exploded assembly diagram of a device similar to the GPS receiver of FIG. 3 that is based on a transparent patch GPS antenna.
Figure 10B:
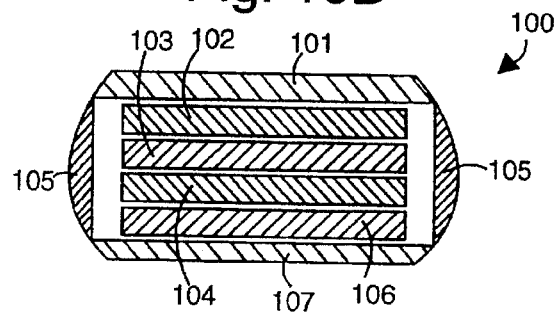
FIG. 10B is a transverse cross-section of the device of FIG. 10A.

FIGS. 10A and 10B illustrate a GPS wristwear receiver 100, which is similar to the receiver 80 in FIGS. 8A and 8B, but differs essentially in the kind of antenna used to receive the navigation satellite transmissions. The GPS wristwear receiver 100 is an assembly of a watch face bezel 101, a transparent patch antenna 102 to receive L-band microwave signals 26, a liquid crystal display (LCD) 103 and an integrated circuit (IC) 104 that all fit into a watch case 105. For construction of the transparent patch antenna 102, see, U.S. Pat. No. 5,272,485, issued Dec. 21, 1993, to Mason, et al., and incorporated herein by reference. A battery 106 fits in behind and is held in by a backing plate 107. The IC 104 includes, for example, the LNA 28, downconverter 30, code-processor 32, navigation processor 36, database 40, a radio receiver or pager receiver 41 and DUART 42. The LCD 103 is similar to LCD 38. The transparent patch antenna 102 comprises a disk of sapphire to serve as a dielectric substrate with gold film or indium-tin-oxide (ITO) patterned top and bottom to form a microwave patch antenna. For example, the bottom is completely covered with a see-through conductive layer to serve as a ground-plane. The top, outward surface has a rectangle patterned at the center of the sapphire. The dimensions of the rectangle depend on the wavelengths of the signals to be received. The remaining implementation of the antenna 102 can follow conventional steps that are well known to artisans.

Figure 11A:
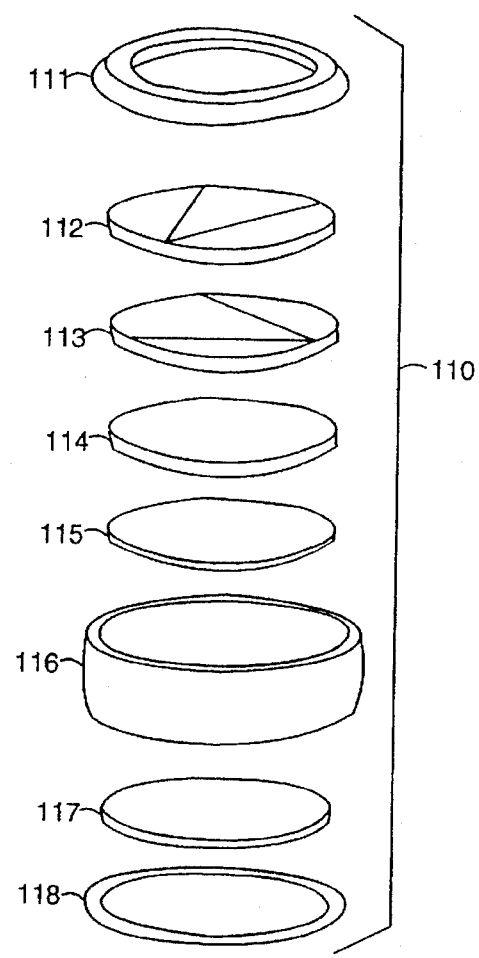
FIG. 11A is an exploded assembly diagram of a device similar to the GPS receiver of FIG. 3 that is based on a folded dipole GPS antenna.
Figure 11B:
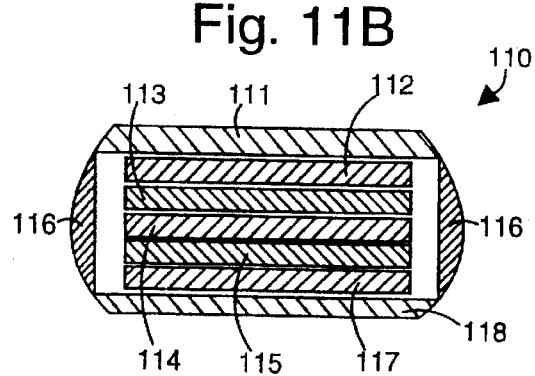
FIG. 11B is a transverse cross-section of the device of FIG. 11A.

FIGS. 11A and 11B illustrate a GPS wristwear receiver 110, which is similar to the receiver 80 in FIGS. 8A and 8B, but differs essentially in the kind of antenna used to receive the navigation satellite transmissions. The GPS wristwear receiver 110 is an assembly of a watch face bezel 111, a pair of folded dipole antennas 112 and 113 in quadrature to receive L-band microwave signals 26, a liquid crystal display (LCD) 114 and an integrated circuit (IC) 115 that all fit into a watch case 116. A battery 117 fits in behind and is held in by a backing plate 118. The IC 114 includes, for example, the LNA 28, downconverter 30, code-processor 32, navigation processor 36, database 40, a radio receiver or pager receiver 41 and DUART 42. The LCD 114 is similar to LCD 38.

The implementation of the wrist-worn unit 16 (FIGS. 1 and 2) may resemble any of FIGS. 8A and 8B through 11A and 11B. The integrated circuits, e.g., IC's 84, 94, 104 and 115, however, would include only navigation processor 36, the display 38, the database 40, a radio receiver or pager receiver 41 and the DUART 42.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A navigation wristwear device, comprising:

means for establishing a radio link to communicate downconverted and demodulated code suitable for navigation processing;

a first part including an antenna to receive L-band microwave signals from orbiting navigation satellites, a downconverter connected to remove the carrier frequencies from said signals, and a code processor connected to despread and track said signals and connected to communicate corrected ranging and timing information via the radio link means; and a wrist watch type housing with straps in which is disposed a navigation processor connected to receive said corrected ranging and timing information via the radio link means, and a display connected to receive position, velocity and time information from triangulation of said corrected ranging and timing information.

2. The device of claim 1, wherein:

said code-processor and said navigation-processor are physically separate and physically independent.

3. The device of claim 1, wherein:

the first part is configured to be worn on a part of the body of a user that has better visibility to said orbiting navigation satellites and includes a battery charged by a photovoltaic solar cell to keep it charged and to provide power to the first part.

4. The device of claim 1, wherein:

the first part is configured to be placed in the vicinity of the wrist watch type housing in a position that has better visibility to said orbiting navigation satellites and includes a battery charged by a photovoltaic solar cell to keep it charged and to provide power to the first part.

5. A navigation wristwear device, comprising:

a wrist watch type housing with straps in which is disposed an antenna to receive L-band microwave signals from orbiting navigation satellites, a downconverter connected to remove the carrier frequencies from said signals, and a code processor connected to despread and track said signals and to provide a radio link having corrected ranging and timing information, a navigation-processor connected to receive said radio link having corrected ranging and timing information, and a display connected to receive position, velocity and time information from triangulation of said corrected ranging and timing information;

wherein said antenna is placed in a stack behind a protective bezel and in front of said display and is constructed to permit viewing of said position, velocity and time information on said display through said protective bezel;

said downconverter, code processor and navigation processor all share a single integrated circuit placed beneath said display; and a battery connected to power said single integrated circuit and said display is disposed in the bottom of said wrist watch type housing behind a backing plate.

6. The device of claim 5, wherein:

said antenna comprises a circular dipole in two ring-shaped parts placed together.

7. The device of claim 5, wherein:

said antenna comprises a folded dipole in two transparent disk-shaped parts placed together.

8. The device of claim 5, wherein:

said antenna comprises an annular ring.

9. The device of claim 5, wherein:

said antenna comprises a transparent disk substrate on which is deposited and patterned a transparent conductive material on both sides that serve as a microwave patch electrode and groundplane.

10. A navigation wristwear device, comprising:

means for establishing a radio link to communicate downconverted and demodulated code suitable for navigation processing;

a first part including an antenna to receive L-band microwave signals from orbiting navigation satellites, a downconverter connected to remove the carrier frequencies from said signals, and a code processor connected to despread and track said signals and connected to communicate corrected ranging and timing information via the radio link means; and a wrist watch type housing with straps in which is disposed a navigation processor connected to receive said corrected ranging and timing information via the radio link means, and a display connected to receive position, velocity and time information from triangulation of said corrected ranging and timing information; and wherein said orbiting navigation satellites include a master clock to which said navigation processor recalibrates and synchronizes itself for the presentation of time of day information on said display.

11. The device of claim 10, wherein:

said timing information provided by said orbiting navigation satellites is system time and the local time is computed by said navigation processor from the time zone position of the watch on earth or is assumed, where the correct time zone is known or can be assumed from a last good position fix, as few as one satellite signal is tracked by said code processor and said navigation processor extracts said timing information for watch function.

12. The device of claim 11, wherein:

said single navigation satellite signal is not tracked in real time and samples of the signal are collected and stored, and then decoded in slower-than-real-time post processing by a microcomputer.

\* \* \* \* \*